Feb. 26, 1963

W. S. STERLING 3,079,042

CLOSURE HANDLING MACHINE

Filed March 14, 1958

INVENTOR.
Walter S. Sterling
BY Robert R. Churchill
ATTORNEY

Feb. 26, 1963 W. S. STERLING 3,079,042
CLOSURE HANDLING MACHINE
Filed March 14, 1958 3 Sheets-Sheet 2

INVENTOR.
Walter S. Sterling
BY Robert R. Churchill
ATTORNEY

INVENTOR.
Walter S. Sterling
BY Robert R. Churchill
ATTORNEY

United States Patent Office 3,079,042
Patented Feb. 26, 1963

3,079,042
CLOSURE HANDLING MACHINE
Walter S. Sterling, Quincy, Mass., assignor to Pneumatic Scale Corporation, Limited, Quincy, Mass., a corporation of Massachusetts
Filed Mar. 14, 1958, Ser. No. 721,592
11 Claims. (Cl. 221—14)

This invention relates to closure handling apparatus and more particularly to apparatus for delivering closures from a bulk supply thereof to a closure handling machine.

The invention has for an object to provide novel and improved apparatus of the character specified wherein provision is made for controlling the delivery of closures to the closure handling machine in accordance with the demand therefor and in a manner such as to maintain an adequate supply of closures in the handling machine commensurate with the rate of withdrawal of closures therefrom for most efficient operation.

With this general object in view and such others as may hereinafter appear the invention consists in the closure handling apparatus and in the various structures, arrangements and combinations of parts hereinafter described and particularly defined in the claims at the end of this specification.

In the drawings illustrating the preferred embodiment of the invention:

Figure 1:
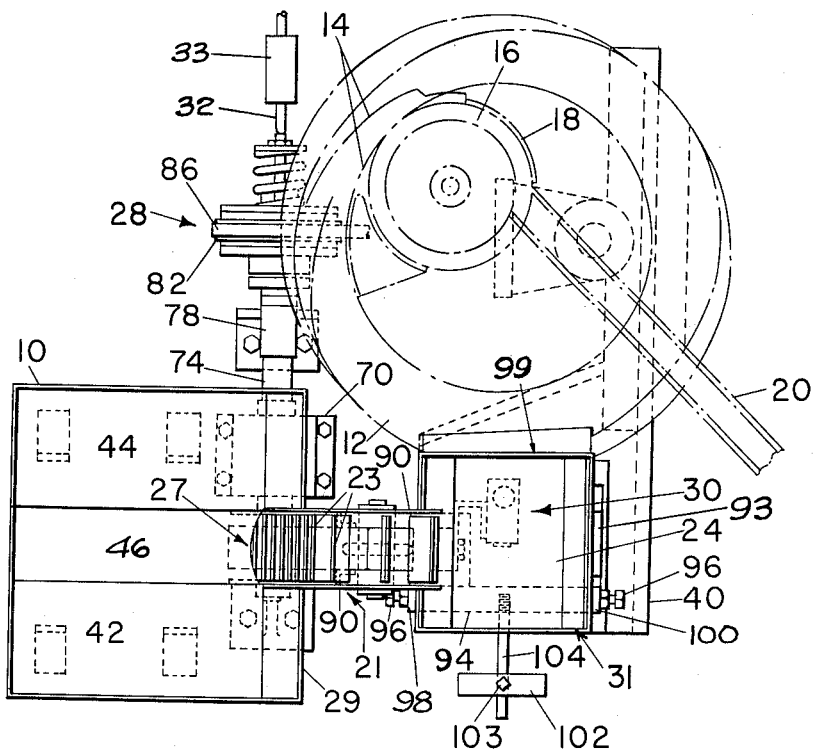
FIG. 1 is a plan view of closure handling apparatus embodying the present invention.

In general the present invention contemplates novel closure handling apparatus embodying means for controlling the delivery of closures from a bulk supply thereof to a closure handling machine, such as a closure orienting and feeding machine of the type illustrated and described in the United States patent to Walter S. Sterling, No. 2,715,978, issued August 23, 1955. In the operation of such orienting machines the closures, such as screw caps released at random from the bulk supply, are guided through orienting mechanism, and the oriented closures are advanced and delivered into the upper end of a feed chute for delivery to a closure applying machine. The closures, oriented to face in the same direction, are successively withdrawn from the lower end of the chute by transfer means forming a part of the closure applying machine and are transferred into operative relation to the applying machine, as illustrated and described in Patent No. 2,715,978 above referred to.

In such prior machines the closures are permitted to flow continuously by gravity from the bulk supply thereof onto a continuously rotating inclined carrier of the orienting machine to form a group thereof, and in operation the group of closures supplied to the carrier are continuously jostled and changed in position by contact with adjacent closures as they are advanced to cause them to assume a predetermined position to be guided into the orienting mechanism. Those closures which enter the orienting mechanism in other than a predetermined position are rejected and fall back onto the carrier to be again advanced and jostled into position. It will thus be seen that in practice the closures are withdrawn from the group thereof at an indeterminate and variable rate in accordance with the number of closures which happen by chance to assume the predetermined position to enter the orienting mechanism. Also, when the supply chute becomes filled, such as occurs when the applying machine is stopped, or when the oriented closures are supplied in excess of the requirements of the applying machine, the surplus closures entering the orienting mechanism are also rejected to fall back onto the carrier. Prior to the present invention it has been attempted to control the supply of closures from the bulk supply hopper onto the carrier by means of a manually adjustable plate for changing the size of the exit opening from the supply hopper. However, in practice it was found that such control was erratic and provided either a surplus of closures on the carrier which caused excessive agitation of the closures and interference with the efficiency of the orienting mechanism, or provided an inadequate supply of closures to the carrier and to the orienting mechanism supplying the demand of the applying machine.

In accordance with the present invention provision is made for controlling the delivery of the closures from the bulk supply thereof so as to provide an adequate supply or group of closures on the carrier of the orienting mechanism to enable the same to keep up with the demand for closures of the applying machine, and to terminate the delivery of closures from the bulk supply when the group of closures on the carrier exceeds the number of closures required to fulfill the demand for closures of the applying machine whereby to avoid unnecessary jostling and agitation and possible marring of the closures on the carrier. The present control mechanism is also arranged to again initiate the delivery of closures from the bulk supply hopper when the group of closures on the carrier falls below a predetermined normal amount, thereby maintaining the group of closures on the carrier at a predetermined substantially constant amount for the most efficient operation of the orienting mechanism and in an amount sufficient to compensate for the number of closures being withdrawn from the group by the orienting mechanism and from the feed chute by the applying machine.

Referring now to the drawings, the present invention is illustrated as embodied in a closure handling, orienting and feeding machine of the type illustrated and described in the United States Patent No. 2,715,978 wherein a bulk supply of closures may be stored in a hopper 10 to be delivered to a rotary inclined carrier 12, shown in dotted lines, and which is adapted to advance the randomly arranged closures deposited at the lower end of the carrier to form a group thereof and to carry the closures upwardly into engagement with guide means indicated generally at 14. Successive closures arriving at the upper end of the inclined carrier are guided into engagement with the beveled marginal edge of a rotary orienting disk 16 arranged in a substantially horizontal plane and preferably in a plane slightly inclined downwardly with respect to the plane of the carrier disk 12. As the closures are advanced along the edge of the orienting disk 16 they leave the carrier 12 and are supported between the beveled edge of the orienting disk 16 and a cooperating stationary closure supporting rail 18. In operation those closures assuming a desired predetermined position between the orienting disk 16 and the rail 18 are capable of maintaining their stability and are, therefore, advanced into the upper end of a delivery or feed chute 20 for delivery to the closure applying or other machine. Those closures assuming other than the desired position are incapable of maintaining their stability between the disk 16 and rail 18 and fall back onto the carrier 12 to be returned to the main group of closures at the lower end of the carrier 12 to be again advanced into engagement with the orienting mechanism.

In accordance with the present invention provision is made for delivering the closures from the bulk supply thereof by means of a transfer conveyor indicated generally at 21 which is arranged to withdraw the closures from a bulk supply thereof disposed a substantial distance below the carrier 12 and to deposit the closures onto a counterweighted plate 24 disposed adjacent the carrier and intermediate the delivery end of the conveyor and the carrier and over which the closures pass prior to being deposited onto the carrier 12 of the orienting machine. The counterweighted plate 24 forms part of the control mechanism indicated generally at 22 in FIG. 4 which is arranged to discontinue the operation of the transfer conveyer when the group of randomly arranged closures deposited on the rotary inclined carrier 12 of the orienting machine is increased beyond a normal predetermined amount and to again start the operation of the transfer conveyer when the group of closures on the carrier returns to or falls below said normal amount. The conveyor 21 is arranged substantially vertically, herein shown as slightly inclined from the vertical, and is provided with a plurality of equally spaced upstanding and transversely extended blades 23 forming pockets 25 therebetween. The outer run of the conveyor 21 is arranged to cooperate with the bulk supply hopper 10 to pick up the closures in the pockets 25 as the conveyer passes through a slotted opening 27 formed in the inclined front wall 29 of the bulk supply hopper 10. The transfer conveyor 21 is preferably arranged at a slight incline from the vertical, as shown, in order to retain the closures in the pockets as the closures are carried upwardly, and when the closures are carried over the upper end of the conveyor the closures fall out of the pockets 25 of the conveyer into an intermediate compartment 31 and onto the counterweighted plate 24 which forms the bottom wall of the compartment. The transfer conveyer 21 is preferably driven through driving mechanism including a normally engaged clutch indicated generally at 28, and the plate 24 is arranged to cooperate with a pneumatically operated control unit indicated generally at 30 forming a part of the control mechanism 22 and which is operatively connected to a plunger 32 arranged to cooperate with and disengage the clutch 28.

In operation when the closures delivered by the transfer conveyor 21 are permitted to flow freely across the counterweighted plate 24 to join the group in the carrier 12 which are continuously moved past the delivery end of the plate 24, the conveyer 21 is continuously operated indicating that the closures are being withdrawn from the group, oriented and deposited in the feed chute 20 at a rate commensurate with the withdrawal of closures from the delivery end of the feed chute by the closure applying machine. However, in the event that the group of closures on the carrier is increased, such as occurs when the supply of oriented closures exceeds the demand for closures of the closure applying machine causing the surplus closures to be rejected from the orienting mechanism to join the group at the lower end of the carrier, the group is increased to an extent such as to impede the free flow of the closures across the counterweighted plate 24, causing the closures to build up on the plate to such an extent that the weight thereof effects downward rocking of the counterweighted plate. The downward rocking of the plate is arranged to increase the air pressure in the pneumatically operated control unit 30 which in turn effects outward movement of the plunger 32 to disengage the clutch 28 and stop the conveyer, thus discontinuing the supply of closures to the carrier. Subsequently, when a sufficient number of closures has been withdrawn from the group on the carrier the closures on the counterweighted plate are permitted to pass onto the carrier to join the group, and the plate is then permitted to rock upwardly to its normal position and to reduce the air pressure in the pneumatically operated unit 30 whereupon the clutch disengaging plunger 32 is returned to its initial position to again permit engagement of the clutch to start operation of the delivery conveyer.

As a result of providing a transfer conveyer between the supply hopper and the carrier a more positive control of the supply is afforded since each pocket 25 passing through the hopper picks up a substantially uniform number of closures and the pockets are emptied in succession onto the plate 24. Usually the closures deposited on the plate from one pocket pass across the plate onto the carrier before the contents of the next pocket are emptied onto the plate, and in the event that the closures deposited on the plate by one pocket are impeded in their travel across the plate by the group on the carrier the added closures provided by a succeeding pocket may effect tripping of the control mechanism to stop the conveyer. Another important advantage of providing an elevating transfer conveyer, as illustrated is that the supply hopper 10 may be disposed at a point near the floor rather than in an elevated position above the carrier, thereby facilitating the filling of the supply hopper. If desired, the supply hopper may be disposed at a floor below the closure handling machine and the elevating transfer conveyer extended through the floor to convey the closures upwardly to the closure handling machine.

As herein illustrated, the bulk supply hopper 10 is supported by upstanding legs 34 which are connected by tie pieces 36 extended from a bracket 38. The bracket 38 is attached to a frame member 40 secured to the supporting column 41 of the closure handling machine. The supply hopper 10 is provided with inwardly converging side walls 42, 44 at its lower end terminating in a central semicircular and downwardly inclined trough 46. The slotted opening 27 provided in the inclined front wall 29 of the hopper may be of a width substantially equal to the width of the trough 46, and in operation as the outer run of the conveyer travels through the closures the pockets 25 become filled.

The transfer conveyer 21 may comprise an endless link belt chain 52 having the blades 23 extended therefrom, the chain passing over a drive sprocket 54 at its lower end, and over an idler sprocket 56 at its upper end. The outer run of the conveyer is guided and supported in operative relation to the hopper 10 by elongated angle backing members 58 supported by the tie pieces 36 and by arms 60 extended from the bracket 38. The idler shaft 62 at the upper end of the conveyer is journaled in bearings 64 extended from the angle members 58. The drive shaft 66 at the lower end of the conveyer is journaled in a bracket 68 and comprises the output shaft of a speed reducing unit 70. The input shaft of the speed reducing unit is connected by a flexible coupling 74 to a shaft 76 journaled in a bearing bracket 78 and which forms a part of the clutch unit 28. The clutch unit 28 also includes a drive pulley 82 loosely mounted on the shaft 76 and which is connected by a belt 86 to a motor 84.

Figure 2:
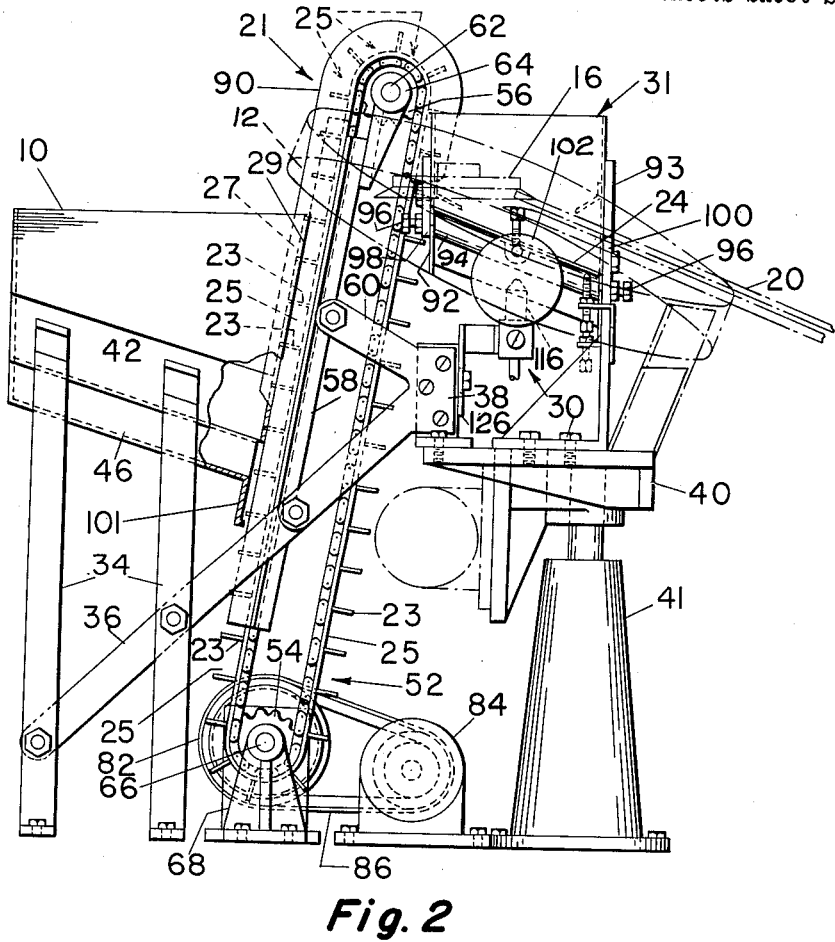
FIG. 2 is a front elevation of the same.

The ends of the pockets 25 defined by the blades 23 are closed by stationary side plates 90 extended along the outer run of the conveyer from a point below the hopper 10 around the upper end of the conveyer and terminating within the compartment 31 at a point a short distance below the upper end of the conveyer on the inner run thereof. The side plates 90 may be supported from the angle members 58. It will be observed that the rear wall 92 of the compartment 31 may also be slotted to permit passage of the inner run of the conveyer therethrough as shown. The compartment 31 may be supported in operative relation to the conveyer 21 and the carrier by an angle bracket 93 attached to the frame member 40. The counterweighted plate 24 closing the bottom of the compartment is preferably supported to be inclined in two different planes, one plane shown in FIG. 2 being inclined downwardly with respect to the conveyer 21, and the other plane shown in FIG. 3 being inclined downwardly toward the carrier 12. The front wall of the compartment adjacent the carrier is provided with a closure escape opening 95 through which the closures may pass directly onto the continuously rotated inclined carrier 12 of the orienting machine at a point adjacent the lower end of the carrier. It will be observed that the portion of the outer run of the conveyer 21 disposed immediately below the hopper 10 may be enclosed by extensions 101 from the hopper to prevent closures from escaping from the lower end of the hopper and through a pocket disposed partially within and partially without the hopper as shown in FIG. 2.

From the description thus far it will be seen that the closures are transferred from the bulk supply hopper 10 to the carrier 12 by the conveyer 21, the pockets 25 of the conveyer being emptied successively into the compartment 31 and the closures passing over the counterweighted plate 24 to join the group of closures on the carrier. As herein illustrated, the plate 24 is provided with a hub portion 94 on its underside and is pivotally mounted between trunnion bearings 96 cooperating with the ends of the hub portion and supported in bearing plates 98, 100 attached to opposed side walls of the compartment 31. As shown, a counterweight 102 is adjustably mounted on a stud 104 extended from the hub portion 94 of the plate 24, and in operation the counterweight may be adjusted by a set screw 103 so as to permit a normal flow of closures across the plate and onto the carrier 12 without effecting depression or downward rocking thereof. As above described, when the group of closures in the carrier is increased to an extent such as to impede the free flow of closures across the plate 24, the accumulated closures on the plate will effect downward rocking thereof.

Figure 4:
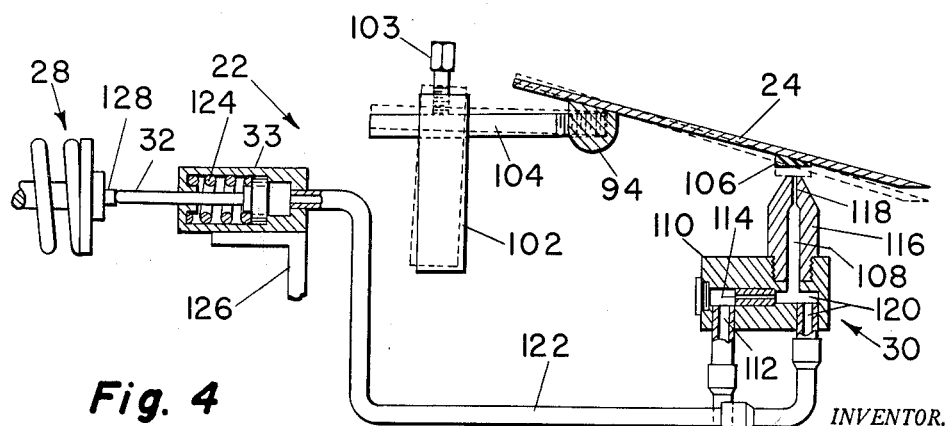
FIG. 4 is a diagrammatic detail view partly in cross section showing the pneumatically operated control mechanism.

The underside of the counterweighted plate 24 is provided with a depending boss 106, shown in FIG. 4, arranged to cooperate with the pneumatic control unit 30. As herein shown, the pneumatically operated unit 30 is provided with an air chamber 108 formed in a block 110 and having an inlet 112 which may be connected to a regulated source of air under pressure, the inlet having a restricted throat portion 114. The outlet from the chamber comprises a nozzle or jet member 116 which is provided with a relatively small orifice 118. The counterweighted plate 24 is arranged to cooperate with the jet member 16 to control the escape of air from the orifice 118.

The plate 24 is normally disposed so that the boss 106 depending from the underside thereof is spaced a short distance from the discharge orifice 118, and when the plate is rocked downwardly a relatively minute distance by the weight of closures accumulated thereon to retard the escape of air through the orifice a relatively large pressure change occurs in the chamber 108. As diagrammatically illustrated in FIG. 4, the chamber 108 is connected by a passageway 120 formed in the block 110 to an air pipe 122 leading to the end of the cylinder 33 of the air plunger 32. The plunger 32 is normally retained in its retracted position by a spring 124 as shown. The cylinder 33 may be supported by a bracket 126 and is disposed to engage an operating pin 128 forming a part of the clutch unit 28.

Figure 5:
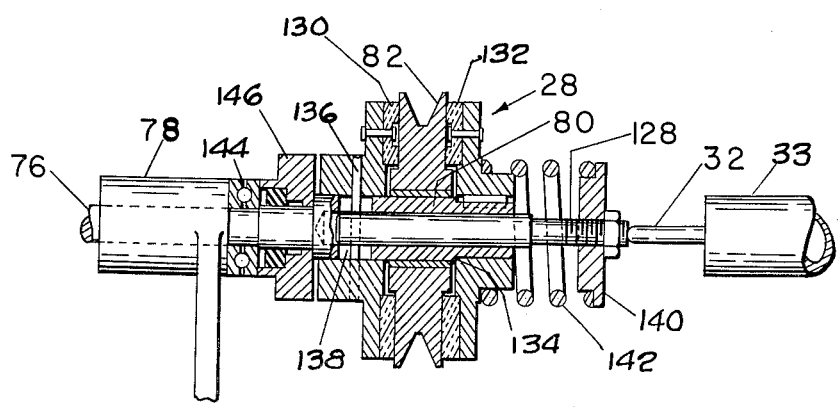
FIGS. 5 and 6 are cross sectional detail views of a clutch mechanism shown in different positions of operation.
Figure 6:
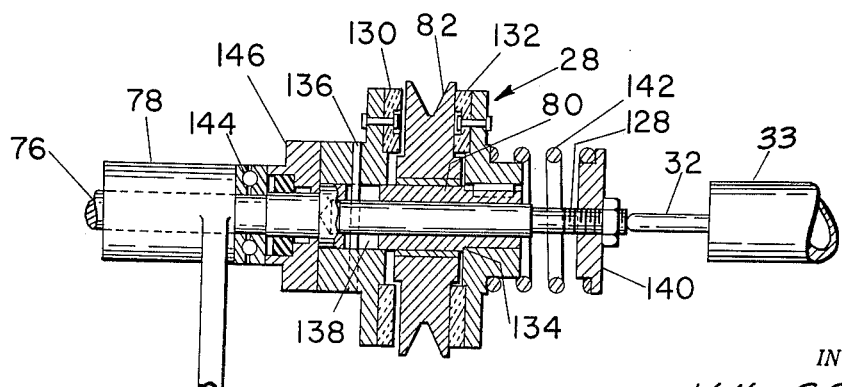

As illustrated in FIGS. 5 and 6, the shaft 76 is provided with a hollow portion 80 on which the drive pulley 82 is loosely mounted, and friction plates 130, 132 are arranged one on each side of the pulley 82. The friction plate 132 on the right side of the pulley is keyed to the hollow portion 80 of the shaft and engages a shouldered portion 134 thereof. The friction plate 130 on the left hand side of the pulley is slidingly mounted on the hollow portion 80 of the shaft and is connected to the end of the operating pin 128 by a pin 136 extended through a slotted portion 138 of the hollow shaft. The operating pin 128 is slidingly mounted within the hollow portion 80 and is provided at its outer extended end with a spring cap 140. A large coil spring 142 interposed between the friction member 132 and the spring cap 140 is arranged to urge the operating pin 128 outwardly and to pull the left hand friction member 130 to the right against the pulley 82 and to press the pulley against the right hand member 132 to engage the clutch and effect driving of the shaft 76 as shown in FIG. 6. As thus constructed it will be seen that movement of the control shaft inwardly or to the left will move the left hand friction member 130 to effect disengagement of the friction clutch as shown in FIG. 6. A suitable thrust bearing 144 may be provided between the bearing 78 and a shouldered portion of the shaft 76, and a bearing disk 146 mounted to rotate on the shaft is arranged to cooperate with the outer face of the friction plate 130 as shown.

Figure 3:
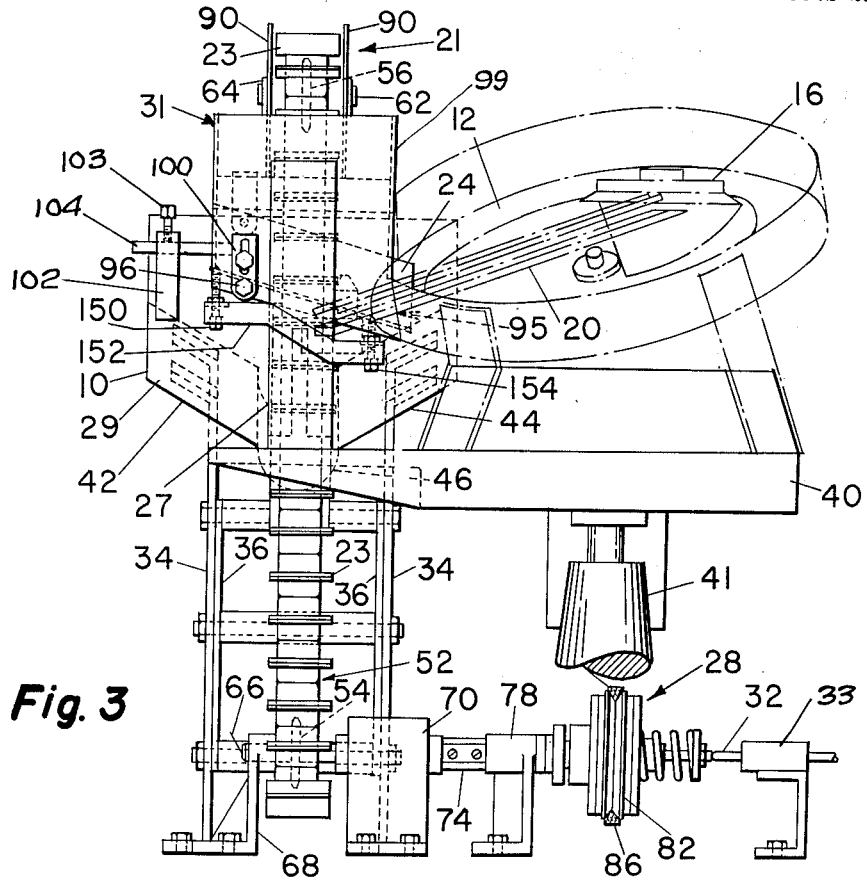
FIG. 3 is a side view of the apparatus.

As illustrated in FIG. 3, the inclination of the plate 24 may be adjusted to suit the particular closures being handled, as determined by the size, shape and weight of the closures, so as to control to some extent the rate of flow of the closures across the plate. In other words, the gravity flow of the closures across the plate may be reduced by the frictional resistance of the plate when the latter is adjusted at less of an incline. This adjustment may be made by an adjusting screw 150 carried by a bracket 152 extended from the arm 27, the screw 150 being disposed to engage the underside of the plate on the counterweight side of the pivot 96. Provision is also made for limiting the downward rocking movement of the plate by an adjusting screw 154 also carried by the bracket 152 and which is disposed to cooperate with the underside of the plate at the free end thereof on the opposite side of the pivot 96. The pneumatically operated unit 30 may be supported by the bar 156 mounted for vertical adjustment on the bracket 38, as shown in FIG. 2, to permit adjustment of the spacing between the air jet 116 and the boss 106 on the underside of the plate.

In operation the counterweight 102 may be adjusted while the machine is in operation at a position of balance where the weight of the closures passing freely across the plate 24 will not effect depression thereof and at a position of balance such that an accumulation of closures impeded in their travel across the plate by an increase of closures in the group on the carrier will effect downward rocking of the plate, as described, such position of balance being determined by the operation of the orienting and applying machines so that the rate of withdrawal of closures from the group in the carrier is substantially commensurate with the rate of withdrawal of closures from the chute 20 by the closure applying machine. It will be observed that the outer end of the plate 24 extends beyond the front wall 99 of the compartment and is disposed a short distance above the upper surface of the continuously moving carrier 12.

In the normal operation of the apparatus the closures delivered to the carrier 12 across the plate 24 and through the opening 95 of the compartment 31 are advanced upwardly on the inclined carrier to permit succeeding closures to flow freely onto the carrier and to join the group being advanced to the orienting mechanism. Those closures not accepted by the orienting mechanism and those rejected therefrom may roll or tumble down the inclined carrier to join the group at the lower end of the inclined carrier. Thus, the group may be increased by building up one upon another to an extent such that the closures being carried past the delivery end of the plate 24 and the opening 95 will impede the free flow of closures from the plate 24 so that the weight of the closures accumulated on the plate will effect depression thereof. It will be understood that in practice the carrier 12 is rotated at a relatively slow rate of speed in the order of 12 to 15 revolutions per minute so that gentle handling of the closures in the orienting machine is assured.

In the operation of the apparatus when the initial adjustments are made, as described, the conveyer 21 will continue in operation to supply closures at a controlled rate into the compartment 31 across the counterweighted plate 24 and through the opening 95 in the compartment to join the group on the carrier. Such operation of the conveyer 21 will continue as long as the closures withdrawn from the group are substantially equal to the controlled supply of closures delivered by the conveyer to maintain a substantially constant number of closures in the group on the carrier. However, in the event that the number of closures being accepted by the orienting mechanism is reduced by reason of excessive rejections of closures therefrom which are then returned to the group, or because of a slowdown or stopping of the carrier 12 or the closure applying machine, the group of closures in the carrier will be increased to an extent such as to impede the flow of closures from the plate. The weight of the closures thus accumulated on the plate will effect downward rocking thereof to actuate the pneumatic control mechanism and disengage the clutch to terminate operation of the transfer conveyer 21. Subsequently, when the group of closures on the carrier is again reduced by continued withdrawals therefrom by the orienting mechanism, the closures on the plate are free to join the group, thus reducing the number on the plate and permitting upward rocking of the plate and engagement of the clutch to initiate operation of the transfer conveyer.

From the above description it will be observed that the present closure handling apparatus embodies novel closure transfer and control mechanism for controlling the supply of closures being delivered from the bulk supply thereof, and is adapted to terminate delivery of closures from the bulk supply when the number of closures on the carrier exceeds a normal amount commensurate with the withdrawal rate of the orienting mechanism whereby to maintain a substantially constant amount of closures in the group for most efficient operation of the orienting mechanism. It will also be observed that the provision of a transfer delivery conveyer between the bulk supply and the orienting machine permits the bulk supply to be disposed in a position remote from the orienting machine or in a convenient lowered position relative to the orienting machine as distinguished from the disposition of the bulk supply in an elevated position relative to the orienting machine as required in a gravity type closure supply.

The transfer mechanism is herein illustrated as comprising an elevating conveyer wherein the closures are supplied to the conveyer by the supply hopper and are carried up and deposited into the compartment 31. However, the present invention also contemplates other types of transfer conveyers arranged to deliver the closures or other articles in controlled quantities, such as a horizontal conveyer, or a horizontal vibratory conveyer.

While the preferred embodiment of the invention has been herein illustrated and described, it will be understood that the invention may be embodied in other forms within the scope of the following claims.

Having thus described the invention, what is claimed is:

1. In a closure handling machine for orienting and feeding closures, in combination, a continuously moving inclined carrier, a bulk supply hopper disposed below the continuously moving carrier of the closure handling machine, means for delivering closures from the bulk supply hopper onto the carrier to form a group thereof from which the closures are withdrawn at random and at an indeterminate rate, said delivery means including an intermediate compartment having a discharge opening therein, a conveyer having a plurality of pockets arranged to receive closures from the supply hopper and to elevate and deliver the closures in controlled amounts to said intermediate compartment and through said opening to the carrier of the handling machine, means for driving the conveyer including a normally engaged clutch, and control means responsive to an accumulation of closures in said group of closures on said carrier beyond a normal height so as to impede the free flow of articles through said opening for disengaging said clutch to discontinue the operation of said conveyer and for permitting engagement of said clutch to initiate operation of the conveyer when the accumulation of closures in said group on the carrier is decreased below said normal height.

2. A combination as defined in claim 1 wherein the supply hopper is provided with an inclined bottom wall and a front wall having an opening therein through which the carrying run of said conveyer passes in communication with closures contained in the hopper.

3. In a closure handling machine for orienting and feeding closures, in combination, a continuously moving inclined carrier, a bulk supply hopper disposed below the continuously moving carrier of the closure handling machine, means for delivering closures from the bulk supply hopper onto the carrier to form a group thereof from which the closures are withdrawn at random and at an indeterminate rate, said delivery means including an intermediate compartment having a discharge opening therein, a transfer conveyer having a plurality of pockets arranged to receive the closures from the supply hopper and to elevate and deliver the closures in controlled amounts to said intermediate compartment and through said opening to the handling machine, an inclined counterweighted plate in said compartment across which the closures delivered by the conveyer pass through said opening to join said group on the continuously moving carrier, said group being arranged to impede the passage of closures across the plate when the group is increased beyond a predetermined normal height, means for driving the conveyer including a normally engaged clutch, and control means responsive to the weight of an accumulation of closures impeded in their passage on said plate for disengaging said clutch to terminate operation of said conveyer and for permitting engagement of said clutch when the group is decreased below said normal height and the plate is again cleared of closures.

4. A combination as defined in claim 3 wherein the control means includes a pressure responsive pneumatically operated unit cooperating with said plate upon rocking of the latter under the influence of the weight of the closures thereon.

5. A combination as defined in claim 4 wherein the rocking of said plate effects an increase in pneumatic pressure in said unit and a pneumatically operated plunger operatively connected to said unit and cooperating with said normally engaged clutch to effect disengagement thereof when the pressure in the unit is increased, said control means permitting engagement of the clutch when the counterweighted plate is rocked upwardly by clearing of the closures therefrom to join the group.

6. In a closure handling machine for orienting and feeding closures, in combination, a continuously moving inclined rotary carrier, a bulk supply hopper disposed below the carrier, means for delivering closures from the bulk supply hopper onto the carrier to form a continuously moving group thereon and from which the closures are withdrawn at random and at an indeterminate rate, said delivery means including an elevating conveyer having a plurality of spaced pockets arranged to withdraw and elevate successive substantially uniform loads of closures from said supply hopper, a compartment open at top and bottom disposed above the lower edge of said inclined rotary carrier arranged to receive successive uniform loads of closures elevated by said conveyer, said compartment having a discharge opening in one wall thereof and a pivotally mounted and counterweighted inclined plate closing the bottom of said compartment and arranged to guide successive uniform loads of closures across said plate and through said opening toward said lower edge to join the group on the continuously rotated inclined carrier, the continuously moving group on said carrier being normally clear of said discharge opening to permit free passage of successive loads onto the carrier and being arranged to impede the flow of closures across the plate when such group is increased beyond a predetermined amount, and control means responsive to the weight of more than one load of closures in said compartment impeded by said carrier group for discontinuing operation of said elevating conveyer, and for again initiating operation of the delivery conveyer when the group of closures on the carrier is decreased below said predetermined amount to clear said opening whereby to maintain a substantially uniform group of closures on said carrier commensurate with the indeterminate rate of withdrawal therefrom.

7. A combination as defined in claim 6 wherein the plate is inclined downwardly toward the carrier in a longitudinal direction, and is inclined parallel to the inclination of the carrier in a transverse direction to guide successive loads of closures toward the lower edge of the rotary carrier.

8. A combination as defined in claim 6 wherein the compartment is provided with an opening in a side wall through which the upper portion of the elevator conveyer extends.

9. A combination as defined in claim 6 wherein the supply hopper is provided with an inclined bottom wall and a front wall having an opening therein through which the carrying run of the elevator conveyer passes in communication with the closures contained in the hopper, said bottom wall having a depending extension enclosing the adjacent portion of the carrying run to prevent escape of closures.

10. In a closure handling machine for orienting and feeding closures, in combination, a continuously moving inclined rotary carrier, a closure receiving compartment open at both ends disposed above and along the edge of the inclined rotary carrier spaced laterally from the lowermost edge and in the direction of travel of the closures on the rotary carrier, said compartment having a discharge opening in one wall thereof, a counterweighted inclined plate closing the bottom of the compartment, closure delivery means for depositing successive uniform loads of closures into said compartment to pass across said inclined plate and through said discharge opening onto the continuously rotated inclined carrier to form a group thereof from which the closures are withdrawn at random and at an indeterminate rate, said plate being inclined downwardly toward the carrier in a longitudinal direction, and inclined parallel to the inclination of the carrier in a transverse direction to guide successive loads of closures toward the lowermost edge of the inclined rotary carrier, the continuously moving group on said carrier being normally carried clear of said discharge opening to permit free passage of successive loads onto the lowermost portion of the carrier, and being arranged to impede the flow of closures across the plate when such carrier group is increased beyond a predetermined amount, and control means responsive to the weight of a relatively small group of closures at rest on the plate impeded by said carrier group for discontinuing operation of said closure delivery means and for again initiating operation thereof when the group of closures on the carrier is decreased below said predetermined amount to clear said opening whereby to maintain a substantially uniform group of closures on said carrier commensurate with said indeterminate rate of withdrawal.

11. In an article handling machine, in combination, means for delivering articles to an article orienting device from a bulk supply to form a group thereof from which articles flow at random, said delivery means comprising a supply hopper, an intermediate compartment having an opening in a side wall thereof communicating with said article orienting device and a counterweighted bottom wall, a conveyer for delivering articles to said compartment from the supply hopper, said articles normally flowing freely across said bottom wall through said opening to the article orienting device, and control means actuated by the movement of said bottom wall in response to an accumulation of articles on said bottom wall to terminate delivery of said articles to said compartment and to actuate said conveyor when said articles freely flow across said plate through the opening to the article orienting device.

References Cited in the file of this patent

UNITED STATES PATENTS

| 421,556 | Cooley | Feb. 18, 1890 |
| 448,238 | Johnson | Mar. 17, 1891 |
| 2,033,586 | Noble | Mar. 10, 1936 |
| 2,276,382 | Francis | Mar. 17, 1942 |
| 2,430,407 | Nelson | Nov. 4, 1947 |
| 2,466,386 | Curioni | Apr. 5, 1949 |
| 2,715,978 | Sterling | Aug. 23, 1955 |
| 2,954,862 | Clark | Oct. 4, 1960 |

FOREIGN PATENTS

| 544,575 | Italy | June 16, 1956 |

OTHER REFERENCES

Industrial Automatic Controls (La Joy), published by Prentice-Hall, Incorporated (Englewood Cliffs, N.J.), 1954 (pages 120 and 121 relied on).

Korber et al.: German Application K23,701 III 79b, Aug. 16, 1956.